United States Patent
Korus et al.

(10) Patent No.: US 12,299,106 B2
(45) Date of Patent: May 13, 2025

(54) PROJECT-BASED PERMISSION SYSTEM

(71) Applicant: Palantir Technologies Inc., Denver, CO (US)

(72) Inventors: Hannah Korus, Palo Alto, CA (US); Brian Schimpf, Washington, DC (US); Lam Tran, Palo Alto, CA (US); Mark Elliot, London (GB); Robert Kruszewski, London (GB)

(73) Assignee: Palantir Technologies Inc., Denver, CO (US)

( * ) Notice: Subject to any disclaimer, the term of this patent is extended or adjusted under 35 U.S.C. 154(b) by 285 days.

(21) Appl. No.: 18/109,134

(22) Filed: Feb. 13, 2023

(65) Prior Publication Data
US 2023/0195877 A1    Jun. 22, 2023

Related U.S. Application Data

(63) Continuation of application No. 16/784,225, filed on Feb. 6, 2020, now Pat. No. 11,580,206.
(Continued)

(51) Int. Cl.
*G06F 21/33* (2013.01)
*G06F 9/48* (2006.01)
(Continued)

(52) U.S. Cl.
CPC .......... *G06F 21/335* (2013.01); *G06F 9/4881* (2013.01); *G06F 21/604* (2013.01); *G06F 21/62* (2013.01)

(58) Field of Classification Search
None
See application file for complete search history.

(56) References Cited

U.S. PATENT DOCUMENTS

| | | |
|---|---|---|
| 7,685,206 B1 | 3/2010 | Mathew et al. |
| 8,856,291 B2 | 10/2014 | Bartlett et al. |

(Continued)

OTHER PUBLICATIONS

Extended European Search Report dated Feb. 22, 2021, issued in related European Patent Application No. 20199443.1 (7 pages).
(Continued)

*Primary Examiner* — Bruce S Ashley
(74) *Attorney, Agent, or Firm* — Sheppard Mullin Richter & Hampton LLP

(57) ABSTRACT

Methods, systems, and apparatus, including computer programs encoded on computer storage media for data security protection are provided. One of the methods includes: receiving a job associated with a project, wherein the project is associated with one or more data sources; identifying a plurality of inputs and a plurality of outputs associated with the job; determining a plurality of required permissions associated with the job, wherein each of the required permissions comprises an operation on a required data source, the operation corresponding to at least one of the inputs or the outputs; verifying that the one or more data sources associated with the project comprise the required data source associated with each of the required permissions; and generating a token associated with the job, the token encoding the required permissions associated with the job, wherein the token is required for execution of the job.

20 Claims, 8 Drawing Sheets

Related U.S. Application Data

(60) Provisional application No. 62/912,530, filed on Oct. 8, 2019.

(51) Int. Cl.
*G06F 21/60* (2013.01)
*G06F 21/62* (2013.01)

(56) References Cited

U.S. PATENT DOCUMENTS

| | | |
|---|---|---|
| 10,430,388 B1 | 10/2019 | Saviano et al. |
| 2014/0123312 A1 | 5/2014 | Marcotte |
| 2014/0310769 A1 | 10/2014 | O'Neill et al. |
| 2017/0262421 A1 | 9/2017 | Yue |
| 2019/0197251 A1 | 6/2019 | Balijepalli et al. |
| 2020/0053088 A1 | 2/2020 | Drake et al. |
| 2020/0314068 A1* | 10/2020 | Werner ................ G06F 40/166 |

OTHER PUBLICATIONS

Non-Final Office Action dated May 5, 2022, issued in related U.S. Appl. No. 16/784,225 (16 pages).

* cited by examiner

PROJECT-BASED PERMISSION SYSTEM

CROSS-REFERENCE TO RELATED APPLICATIONS

This application is a continuation of U.S. application Ser. No. 16/784,225, filed Feb. 6, 2020, which claims the benefit under 35 U.S.C. § 119(e) of U.S. Provisional Application No. 62/912,530, filed Oct. 8, 2019, the contents of each of which are incorporated by reference in their entirety into the present disclosure.

FIELD OF THE DISCLOSURE

This disclosure relates generally to data security systems and, more particularly, to improved data security systems based on scope of data-processing projects.

BACKGROUND

Under conventional approaches, data security systems may grant permissions for accessing data sources to users and authorize the user to access the data sources by virtue of their identities or roles. A user with permissions to access a data source may be authorized to read, write, or otherwise manipulate the data source for any purposes. However, such role-based access control solutions may give rise to various security issues. For example, an attacker may carry out unauthorized data access or operations by committing identity or credential theft. The attacker may obtain results of the execution and gain a level of access to the data that the attacker is otherwise not entitled to. It can be appreciated that there is a need for an improved data security system, which allows permission control based on user activities on top of user identifiers as well as isolation and segregation of permissions based on projects or groups of operations. The present technology fulfills this need and provides further related advantages.

SUMMARY

Various embodiments of the present disclosure can include systems, methods, and non-transitory computer readable media configured to provide a data security solution through which permissions for accessing data sources can be controlled based on scope of projects and data operations. Data processing tasks may be organized into various projects, each of which may have a scope of accessible data sources. When a new job that comprises executable code corresponding to various data transformations is created within a project, the data security solution may determine data access permissions required by the job based on the inputs and outputs of the data transformations. The new job may be examined to determine whether its required data sources fall within the scope of the job's corresponding project and whether the creator of the job possesses the job's required permissions. Based on the verifications, a token specifying the permissions required by the job may be created and be required for executing the data transformations in the job. A client or service needing to execute the job may be granted the token and may use the token to execute the data transformations associated with the job.

For example, in one embodiment, the methods, systems, and non-transitory computer readable media can be configured to execute operations including receiving, from a client device associated with a user, a job associated with a project, wherein the project is associated with one or more data sources; identifying a plurality of inputs and a plurality of outputs associated with the job; determining a plurality of required permissions associated with the job, wherein each of the required permissions comprises an operation on a required data source, the operation corresponding to at least one of the inputs or the outputs; verifying that the one or more data sources associated with the project comprise the required data source associated with each of the required permissions; and generating a token associated with the job, the token encoding the required permissions associated with the job, wherein the token is required for execution of the job. In some embodiments, the job comprises one or more data transformations. In some embodiments, the one or more data sources associated with the project comprise one or more data sources internal to the project or one or more data sources external to the project, wherein the project comprises a reference to each of the one or more data sources external to the project. In some embodiments, the one or more required permissions comprise reading data from a data source external to the project or writing to a data source external to the project.

In some embodiments, the operations further comprise identifying a plurality of permissions possessed by the user and verifying that the permissions possessed by the user comprise the one or more required permissions associated with the job.

In some embodiments, the operations further comprise receiving, from a service, a request for the token associated with the job; verifying that the service is authorized to execute the job; and granting the token to the service. In some embodiments, the operations further comprise determining that the service has completed executing the job and revoking the service's entitlement to the token.

In some embodiments, the operations further comprise receiving, from a service, a request to execute one or more data transformations, wherein the request comprises the token associated with the job; verifying that the required permissions encoded in the token comprise each of one or more permissions required for executing the one or more data transformations; and communicating, to the service, a response approving the request. In some embodiments, the operations further comprise obtaining a result associated with execution of the one or more data transformations; verifying that the service possesses one or more permissions required for accessing the result; and providing the result to the service. In some embodiments, the operations further comprise receiving, from a service, a request to execute one or more data transformations, wherein the request comprises the token associated with the job; determining that at least one of the one or more data transformations require a permission exceeding the required permissions encoded in the token; and communicating, to the service, a response denying the request.

Each feature or concept outlined above is independent and can be combined with other features or concepts outlined above or with any other feature or concept disclosed in this application. Other features and advantages of the disclosure should become apparent from the following description of the preferred embodiments, taken in conjunction with the accompanying drawings, which illustrate, by way of example, the principles of the disclosure.

DETAILED DESCRIPTION

An improved approach rooted in computer technology overcomes the previously discussed problems and other difficulties associated with conventional approaches. Based on computer technology, the disclosed embodiments can provide a data security solution through which permissions for accessing data sources can be controlled based on a scope of a given project and data operations. In some embodiments, data processing tasks may be organized into various projects, each of which may have a scope of accessible data sources. When one or more data transformations are created within a project, all data sources to be accessed by the transformations and data access permissions required by the transformations may be identified (e.g., based on inputs and outputs of the data transformations). The data transformations may be examined to determine whether their required data sources fall within the scope of their corresponding project and whether the creator of the transformations possesses the required permissions. Based on the verifications, a token specifying the permissions required by the transformations may be created and be required for executing the data transformations. The token may be free of user information. A service or client needing to execute the data transformations may be granted the token and may use the token to execute the data transformations. Execution of data transformations that exceed the permissions encoded in a corresponding token may be intercepted. Use of the token may add a user-independent and project-based layer of access control on top of role-based access control solutions and can thereby prevent security attacks based on identity-related loopholes.

Figure 1:
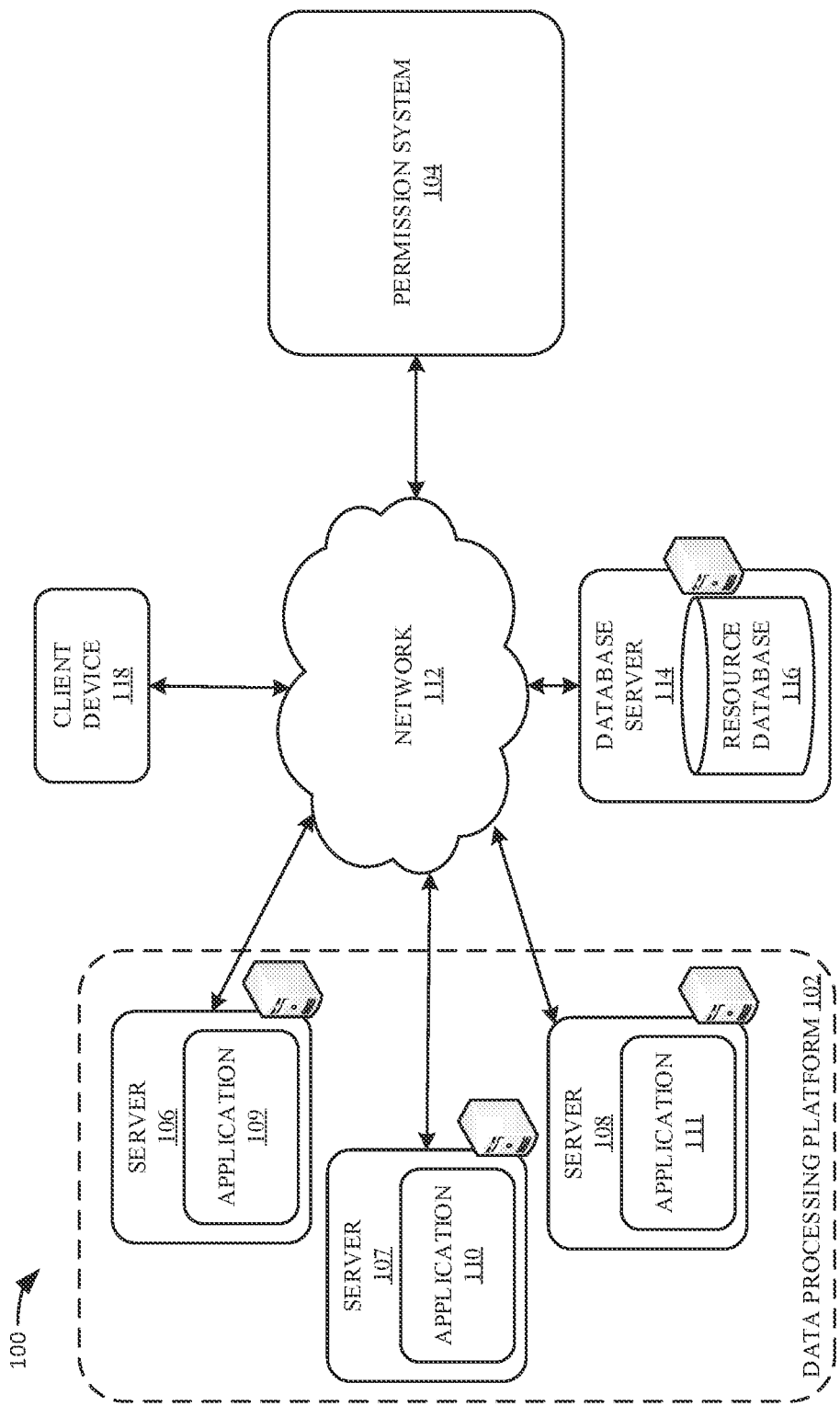
FIG. 1 illustrates an example network system comprising one or more components configured to manage access to one or more data sources in accordance with some embodiments.

FIG. 1 illustrates an example network system 100 comprising one or more components configured to manage access to one or more data sources in accordance with some embodiments. The network system 100 may comprise a data processing platform 102 in communication with permission system 104 configured for registering and evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyze data to develop various insights about the data, and visualize various metrics associated with the data. To further this example, the network application 109 may be used to analyze data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 are in communication with the permission system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

To access data resources from the resource database 116, the servers 106-108 may transmit access requests via the network 112 to the permission system 104. An access request may comprise an identifier of a data resource, an identifier of a user (also referred to herein as a "requesting user") who is utilizing one of the applications 109-111 to access to the data resource (also referred to herein as a "requesting application"), information associated with one or more projects, jobs, or data transformations making use of data in the data resource, one or more credentials (e.g., a permission token) used to access the data resource, other suitable information, or any combination thereof. The permission system 104 may include an application programming interface (API) or other machine interface to receive such access requests from the server 106-108 hosting the requesting application 109-111.

Upon receiving an access request for a particular data resource, the permission system 104 accesses a separately stored policy object associated with the particular data resource. Policy objects are stored in a database of the permission system 104, which is maintained independently of the resource database 116.

A policy object is a data structure that includes an identifier (e.g., a globally unique resource identifier) of the data resource to which it is associated, an identifiers of a parent data resource from which the data resource depends (referred to as a "parent identifier"), and policy information that includes dependent resource identifiers. The policy information also includes one or more statements that specify one or more conditions required for performing one or more operations with respect to the data resource. The conditions may be associated with, for example, an identity of a requesting user, an identity of a requesting application, information associated with a project that includes the one or more operations to be performed, presence of one or more credentials for performing the operations, other suitable factors, or any combination thereof. Authorized operations may be globally applicable to the network system 100, or may be specific to any one of the network applications 109-111.

The permission system 104 may determine whether the access request shall be approved based on the policy information associated with the policy object and may communicate a response to the access request to the requesting application. In some embodiments, the permission system 104 may communicate one or more data packets (e.g., computer-readable information) to the server hosting the requesting application as a response to the access request.

In some embodiments, the permission system 104 may serve as a centralized permission system that communicates with the data processing platform 102 via the network 112 to evaluate access permissions of operations with respect to a data resource stored in the resource database 116. In other embodiments, the permission system 104 may be integrated as one or more other components of the network system 100 such as the data processing platform 102 or the database server 114. The permission system 104 may be implemented on one or more computing devices separate and independent from one or more computing devices associated with the data processing platform 102 the database server 114, or other components of the network system 100. Alternatively, the permission system 104 may share one or more computing devices with one or more other components of the network system 100.

As shown, the network system 100 also includes a client device 118 in communication with the data processing platform 102 and the permission system 104 over the network 112. The client device 118 communicates and exchanges data with the data processing platform 102.

The client device 118 may be any of a variety of types of devices that include at least a display, a processor, and communication capabilities that provide access to the network 112 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the permission system 104 provides user interfaces to the client device 118 (e.g., by communicating a set of computer-readable instructions to the client device 118 that cause the client device 118 to display the user interfaces) that allow a user to register policies associated with data resources stored in the resource database 116. More details describing the permission system 104 are provided in reference to FIG. 2.

Figure 2:
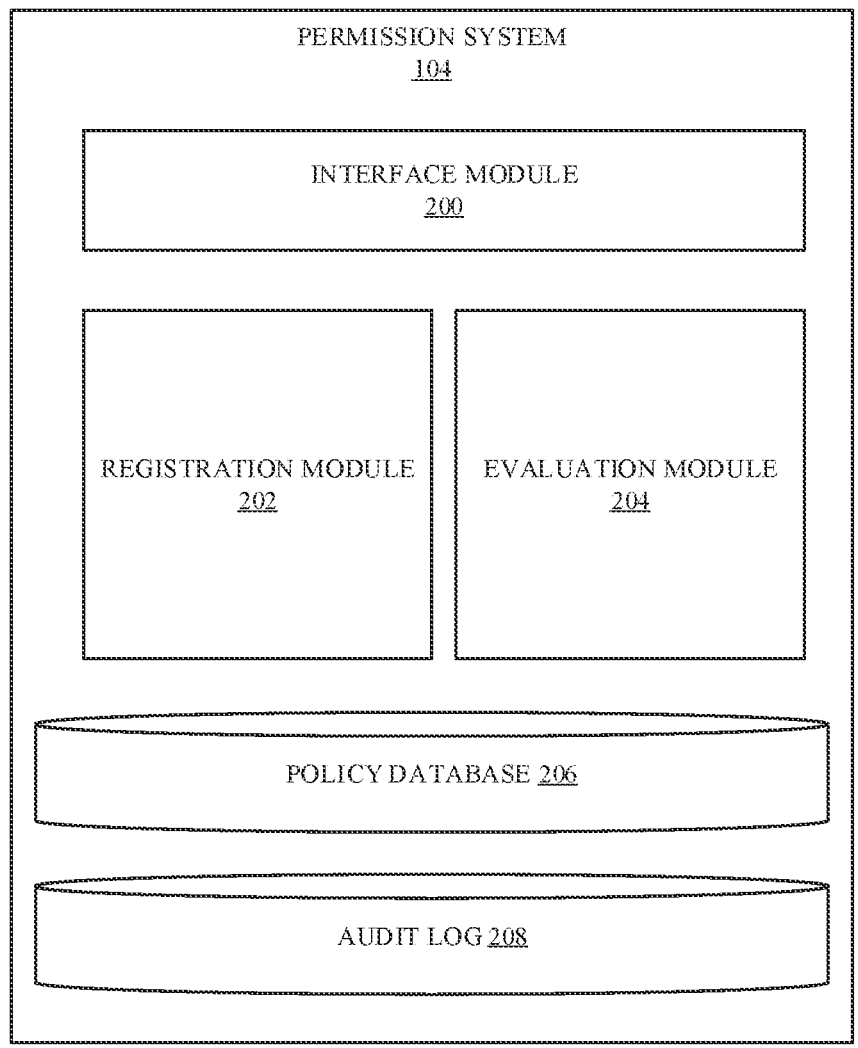
FIG. 2 illustrates an example permission system in accordance with some embodiments.

FIG. 2 illustrates an example permission system 104 in accordance with some embodiments. To avoid obscuring the inventive subject matter with unnecessary detail, various functional components (e.g., modules and engines) that are not germane to conveying an understanding of the inventive subject matter have been omitted from FIG. 2. However, a skilled artisan will readily recognize that various additional functional components may be supported by the permission system 104 to facilitate additional functionality that is not specifically described herein.

As is understood by skilled artisans in the relevant computer arts, each functional component (e.g., module) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The permission system 104 is shown as including an interface module 200, a registration module 202, and an evaluation module 204, all configured to communicate with each other (e.g., via a bus, shared memory, a switch, or application programming interfaces (APIs)). The aforementioned modules of the permission system 104 may, furthermore, access a policy database 206 and an audit log 208. The policy database 206 and the audit log 208 each reside on a machine-readable storage medium of the permission system 104. The policy database 206 and audit log 208 may be maintained independent of one another.

The interface module 200 receives requests from various devices (e.g., servers 106-108) and communicates appropriate responses to the requesting devices. The interface module 200 provides interfaces to allow devices to request access to data resources stored in the resource database 116. For example, the interface module 200 may receive access requests for data resources in the form of application programming interface (API) request.

The interface module 200 also provides user interfaces to users of the network system 100 (e.g., by communicating a set of computer-readable instructions to computer devices of the users). The interface module 200 also receives user input received through such user interfaces, and passes the received user input on to the applicable component of the permission system 104. As an example, the interface module 200 provides user interfaces to allow users to register and modify policies associated with data resources stored in the resource database 116.

Policies form the basis of a security model supported by the permission system 104. Each policy may be composed of a set of unordered statements, and each statement evaluates to a Boolean value of either "TRUE" or "FALSE" and includes: an operation or set of operations that is affected by the statement, an action to take with the specified operation, and a condition used to determine application of the specified application to specified operations.

For each data resource stored in the data resource database 116, the permission system 104 may maintain a data structure in the policy database 206 that includes a simple resource graph designed to emulate basic file system-like structures and also accommodate dependencies on related resources. Each node in the resource graph represents a data resource. In this way, the permission system 104 may maintain a representation of a data resource's permission hierarchy in a simple unified object that can be evaluated in isolation. Accordingly, the policy object provides an "effective policy" for each data resource in that each policy object contains the policy information for the entire hierarchical access permission tree in an ordered format such that the evaluation module 204 only needs the effective policy to determine a user's permissions.

The registration module 202 is responsible for registering policies associated with data resources stored in the resource database 116. As part of the registration process, the registration module 202 receives and processes policy registration data submitted by users through user interfaces provided by the interface module 200 (e.g. by providing a set of computer-readable instructions to computer devices of the users) that allow the users to register and modify policies associated with data resources.

During the registration process, a user may interact with various interface elements (e.g., through one or more input devices) of user interfaces to specify policy registration data including: a resource identifier corresponding to a data resource, and a policy associated with the data resource. Each policy may specify one or more authorized operations with respect to the data resource based on satisfaction of required conditions. Upon determining that the user is authorized to create a new policy or modify an existing policy, the registration module 202 registers the policy specified by the user.

In registering a policy, the registration module 202 stores a policy object in the policy database 206. Each policy object is a data structure that is linked to a data resource, although the policy objects and data resources are separately maintained—policy objects are stored in the policy database 206 and data resources are stored in the resource database 116. Each policy object includes: a resource identifier corresponding to the data resource to which the policy is associated; one or more parent identifiers, each of which identify a parent data resource from which the data resource is dependent, if applicable; and a policy associated with the data resource.

Each policy includes one or more statements that specify particular authorized operations with respect to a particular data resource. In particular, each statement includes a field for each operation (or set of operations), an action, and a condition. The operation field corresponds to an operation that a user is authorized to perform with respect to the data resource. Each operation may be globally applicable to the permission system 104 or may be specifically related to one of the network applications 109-111.

Each statement executes according to satisfaction of the particular conditions included therein. As an example, the condition may specify a particular user identifier corresponding to an allowed user, and the condition is satisfied if the user identifier of the requesting user matches the user identifier of the allowed user. As another example, the condition may be a temporal condition such as a time range in which a requesting user may access the data resource, and in this way, the conditions may be used to provide an expiration date (or time) for a policy. As another example, the condition may specify an identifier of a project, such that the condition is satisfied when a data transformation included in the project requests access to the data resource. In this way, the condition may be used to limit access to the data resource to specific projects. As yet another example, the condition may specify a certain credential (e.g., a permission token) such that the condition is satisfied when the token is presented at the time when access is requested. Additional example conditions supported by the permission system 104 include: a DEPENDENT condition to check if the resulting operations from dependencies contain all or any of the condition specified operations; a GROUP condition to check if a user possesses all or any of the condition specified groups; a NOT condition to negate the result of another condition; an OR condition that takes two or more conditions and checks if any of them evaluate to true; an AND condition that takes two or more conditions and checks if all of them evaluate to true; a USER condition to check if the requesting user is the allowed user; and a USER TYPE condition that checks if the user is of the allowed type (e.g., user or service). It shall be understood the conditions supported by the permission system 104 may be extensible and are thus not limited to the above referenced examples. Additionally, conditions may be combined together into arbitrary Boolean expressions. The following is an example of such a combination: "NOT(USER=X)"; "AND (USER=X, GROUP=Y)".

Actions included in the action field define a behavior associated with a particular statement such as allowing or denying a user's ability to perform an operation. Further, the actions may include special overrides to other actions in a data resource's policy inheritance chain. As an example, the actions may include the following: an ALLOW action that grants a specified operation to a current context if the condition evaluates to "TRUE"; a DENY action that denies a specified operation if the condition evaluates to "TRUE" a FORCE-ALLOW action that grants specified operations as a special override and causes the system to ignore all DENY and FORCE-DENY actions, if the condition evaluates to "TRUE"; a FORCE-DENY action that denies specified operations unless explicitly overridden by a FORCE-ALLOW statement; a ALLOW-ON-CHILDREN or DENY-ON-CHILDREN that apply only when inherited (e.g., instead of saying a user has (or does not have) rights on a specific node in the graph, a resource can be configured to grant (or deny) access only for child nodes). It shall be understood the actions supported by the permission system 104 may be extensible and are thus not limited to the above referenced examples.

The evaluation module 204 is configured to evaluate access permissions with respect to data resources stored in the resource database 116. The evaluation of access permissions, in most instances, is triggered by receipt of an access request received via an API from a network application supported by the permission system 104 (e.g., network applications 109-111). The access request may include a data resource identifier corresponding to the data resource for which access is being requested, a user identifier corresponding to the requesting user, information associated with one or more projects, jobs, or data transformations making use of data in the data resource, one or more credentials (e.g., a permission token) used to access the data resource, other suitable information, or any combination thereof. In some instances, the access request may further include one or more filters identifying one or more particular operations or sets of operations that are of interest.

In evaluating access permissions with respect to a particular data resource, the evaluation module 204 accesses a policy object associated with the data resource from the policy database 206. To evaluate access permissions for a particular data resource, the evaluation module 204 performs a depth-first evaluation and then follows a simple inheritance model. During evaluation, the evaluation module 204 tracks multiple operation sets corresponding to actions discussed above. In an example, the evaluation module 204 tracks: 1) ALLOW statements; 2) FORCE-DENY statements; and 3) FORCE-ALLOW statements.

At each node of the resource graph included in the policy object stored in the policy database 206, the evaluation module 204 evaluates the parent data resource, then performs a lazy evaluation of the dependencies (e.g. dependencies evaluated only if a condition requires the results), then evaluates the local node (e.g. the data resource for which access permission is being evaluated), and returns a merge of parent and local results.

At the top most request level, the evaluation module 204 collapses the tracked operation sets into a single set. The process for collapsing the tracked operation sets includes creating an empty set and adding all explicitly allowed operations in the empty set. The evaluation module 204 then removes all explicitly denied operations. During this operation, a special operation is used to remove all previously granted operations. The evaluation module 204 then adds all FORCE-ALLOW statements to the set.

Upon determining access permissions for an access request, the evaluation module 204 communicates a response to the access request to a requesting network application 109-111 (e.g., via appropriate API call). The response includes a set of operations that are authorized to perform with respect to the data resource. In instances in which the access request includes operation filters, the response communicated to the requesting application 109-111 may include only those operations of interest to the application 109-111, and as such, the generation of the response may include omitting a portion of the set of all operations that users are authorized to perform with respect to the data resource. Based on the response received from the evaluation module 204, the requesting application 109-111 may either enable or disable one or more operations that may be performed with respect to the data object depending on the determined access permissions.

For each received access request, the evaluation module 204 creates and stores an access request log in an audit log 208. Each access request log may include a resource identifier, a user identifier, a project identifier, a job identifier, determined access permissions, an identifier of the requestor (e.g., IP address), a timestamp, other suitable information, or any combination thereof.

Figure 3:
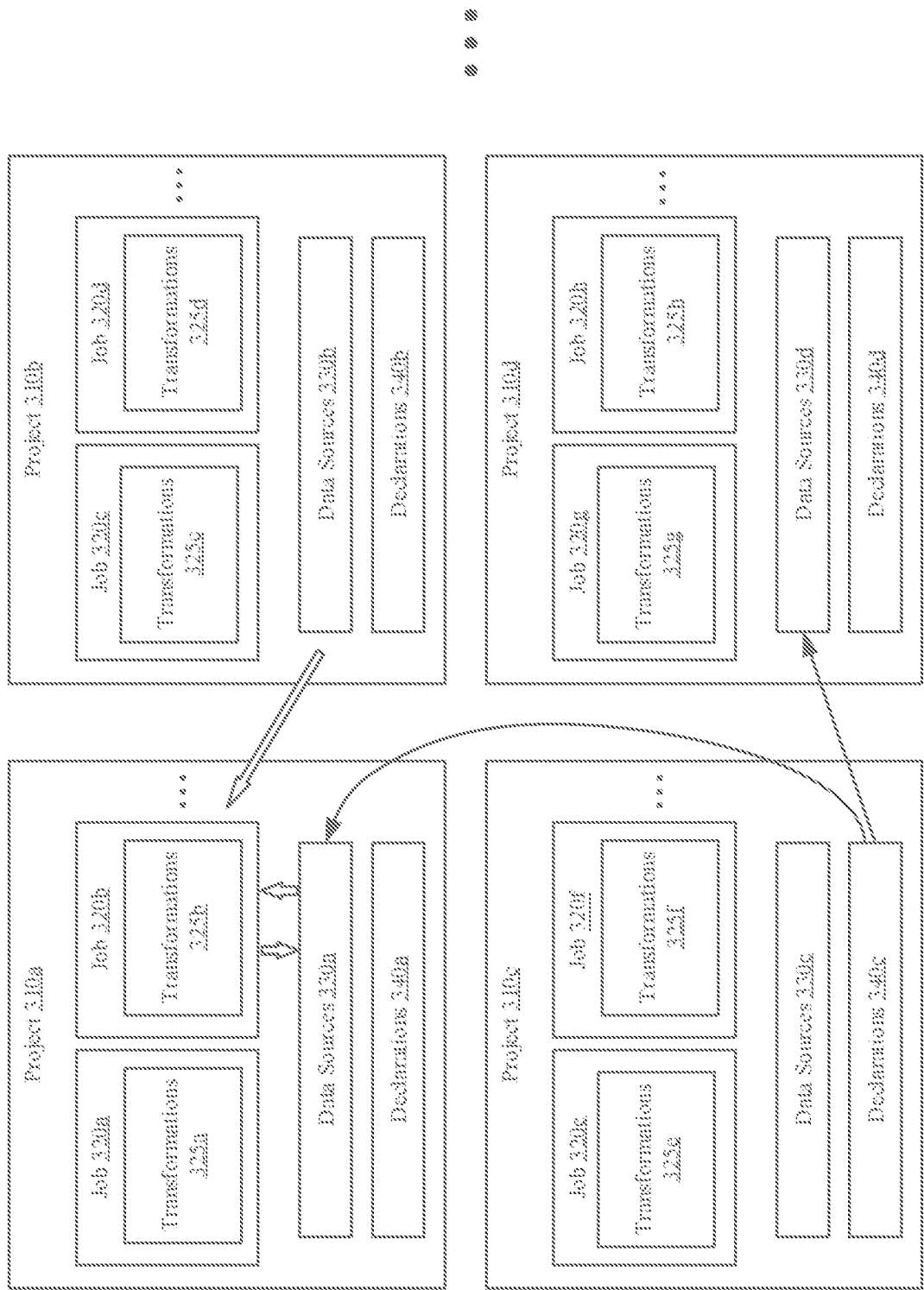
FIG. 3 illustrates a plurality of example projects in accordance with some embodiments.

FIG. 3 illustrates a plurality of example projects in accordance with some embodiments. In some embodiments, use instances of the data processing platform 102 may be organized into a plurality of projects 310. In order to use one or more of the functionalities provided by the network applications 109-111, a user may be required to create a project or operate within an existing project. Four example projects 310a, 310b, 310c, and 310d are illustrated in FIG. 3. The network system 100 may support a plurality of other projects. In some embodiments, a project 310 may comprise one or more jobs 320, each comprising one or more data transformations 325. For example, the jobs associated with the projects 310a, 310b, 310c, and 310d may comprise jobs 320a, 320b, 320c, 320d, 320e, 320f, 320g, and 320h. The jobs may comprise data transformations 325a, 325b, 325c, 325d, 325e, 325f, 325g, and 325h. Each project 310 may comprise additional jobs 320 each comprising suitable data transformations 325. The data transformations 325 may comprise one or more operations on one or more data sources, such as data reading, data writing, data sharing, mathematical calculations, filtering, clustering, sorting, statistics generation, other suitable operations, or any combination thereof. The data transformations 325 may be created in the form of program, code, or instructions executable by one or more of the servers 106-108. Each project 310 may comprise one or more data sources 330. For example, the projects shown in FIG. 3 comprise data sources 330a, 330b, 330c, and 330d.

In some embodiments, each project 310 may be associated with various resources of the network system 100. A project 310 may be created by a user associated with a client device 118 via one or more of the network applications 109-111. One or more jobs 320 in the project 310 may invoke one or more functionalities of one or more of the network applications 109-111. The jobs 320 and the transformations 325 therein may be created by a user using a client device 118 and added to the project 310 by one or more of the servers 106-108. The data sources 330 may correspond to data stored in the resource database 116. In some embodiments, a job 320 in a project 310 may be executable to generate various results such as panels, analysis, reports, additional data sources, or data exports. Such results may be provided for display on the client device 118.

In some embodiments, one or more data transformations 325 may require operations on data from one or more data sources 330. The data sources 330 may or may not belong to the same project as the data transformations 325. For example, the data transformations 325b may be created as part of the job 320b, which is part of the project 310a. The data transformations 325b may require reading data from one or more of the data sources 330a that is also associated with the project 310a as well as from one or more of the data sources 330b that is associated with a different project 310b. The data sources 330b may be external to the project 310a. The data transformations 325b may also require writing data to one or more other data sources of the data sources 330a. In some embodiments, each job 320 may be associated with one or more required permissions. The required permissions may be associated with one or more data sources 330 that data transformations 325 in the job 320 need to access. In some embodiments, one or more data sources 330 may be accessible to a project 310. The one or more data sources 330 accessible to a project 310 may be internal to the project 310 or be external to the project 310. For data sources 330 external to the project 310 to be accessible to the project 310, the project 310 may comprise a reference to the data sources 330. The reference may be included in one or more declarations 340 associated with the project 310. For example, the projects 310a, 310b, 310c, and 310d, as illustrated in FIG. 3, may comprise declarations 340a, 340b, 340c, and 340d, respectively. As an example, the project 310c may comprise one or more declarations 340c. The declarations 340c may comprise one or more references to data sources 330a associated with a project 310a and data sources 330d associated with a project 310d. Both data sources 330a and data sources 330d are external to the project 310c. By default, the data source 330c may be accessible to the project 310c without a corresponding declaration because it is internal to the project 310c.

In some embodiments, one or more permissions may be defined for each job 320. The permissions may specify constraints on what data transformations 325 can be included in the job 320. As an example, transformations 325 in a job 320 may be allowed to read from, write to, or perform data operations to data sources 330 internal to the project 310 comprising the job 320 by default. The permissions may specify one or more external data sources 330 and one or more operations to the external data sources 330 that are required by the transformations 325. In some embodiments, it may be required that permissions of a job 320 in a project 310 only involve access to data sources 330 internal to or otherwise declared by the project 310. Creation of a job 320 that fails such a requirement may be denied by one or more of the servers 106-108. In some embodiments, a similar permission system may be maintained for references to external code repositories. A job 320 in a project 310 may incorporate data sources from one or more other projects. It may be required that the project 310 include one or more references to the needed data sources before the job 320 can be legitimately created.

In some embodiments, in order to execute a job 320, the data processing platform 102 may send one or more access requests to the permission system 104 for a data source 330. The access request may comprise various information associated with the job 320, such as an identifier of a user who provided one or more inputs to trigger execution of the job 320, an identifier of a project 310 including the job 320, an identifier of the job 320, or a token encoding one or more required permissions for the job 320. In response to the access request, the permissions system 104 may identify one or more appropriate policy objects and determine whether the access request shall be approved based on policy information included in the one or more policy objects. As an example, the permission system 104 may identity a policy specifying one or more projects authorized to access the data source 330 and determine, based on a project identifier associated with the project 310, whether the project 310 is among the list of authorized projects. If so, the permission system 104 may approve the access request or check one or more other conditions. Otherwise, the permission system 104 may deny the access request. As another example, the permission system 104 may identify a policy requiring a token encoding a permission to access the data source 330. The permission system 104 may determine whether the access request comprises such a token. If so, the permission system 104 may approve the access request. If not, the permission system 104 may deny the access request.

In some embodiments, the data processing platform 102 may register one or more policies to the permission system 104 based on a creation of or modifications to one or more projects or jobs. As an example, the data processing platform 102 may register in the permission system 104 a policy authorizing users with access to a project 310 to access a data source 330 when a declaration referencing the data source 330 is added to the project 310. As another example, the data processing platform 102 may create a token encoding one or more permissions required by a job 320 when the job 320 is created. The permission system 104 may register a policy allowing access to the data source 330 when the token is presented in an access request.

By defining permissions associated with a job 320, particular embodiments may allow users executing the job 320 to have uniform permissions with respect to the transformations 325 in the job 320. Such permissions associated with the job 320 may or may not be independent of permissions associated with the users. By limiting data available to a job 320 to data sources 330 internal to a project 310 associated with the job 320 and data sources explicitly declared in the project 310, particular embodiments bring about benefits such as localizing data transformation logic, simplifying identifications of owners of jobs 320, providing improved organization of data transformations, simplifying processes for debugging, and clarifying and ensuring security safeguards for each data source 330. Particular embodiments may limit a user's permissions when executing a job 320 to those of the job 320, even if the user otherwise has additional or higher permissions. This may prevent fraudulent exploitation of the user's permissions by a creator of the job 320. Particular embodiments may elevate a user's permissions when executing a job 320 to those of the job 320, even if the user otherwise does not have sufficient permissions to execute the job 320. This may allow delegation of responsibilities to execute the job without compromising the security system maintained by the network system 100.

Figure 4A:
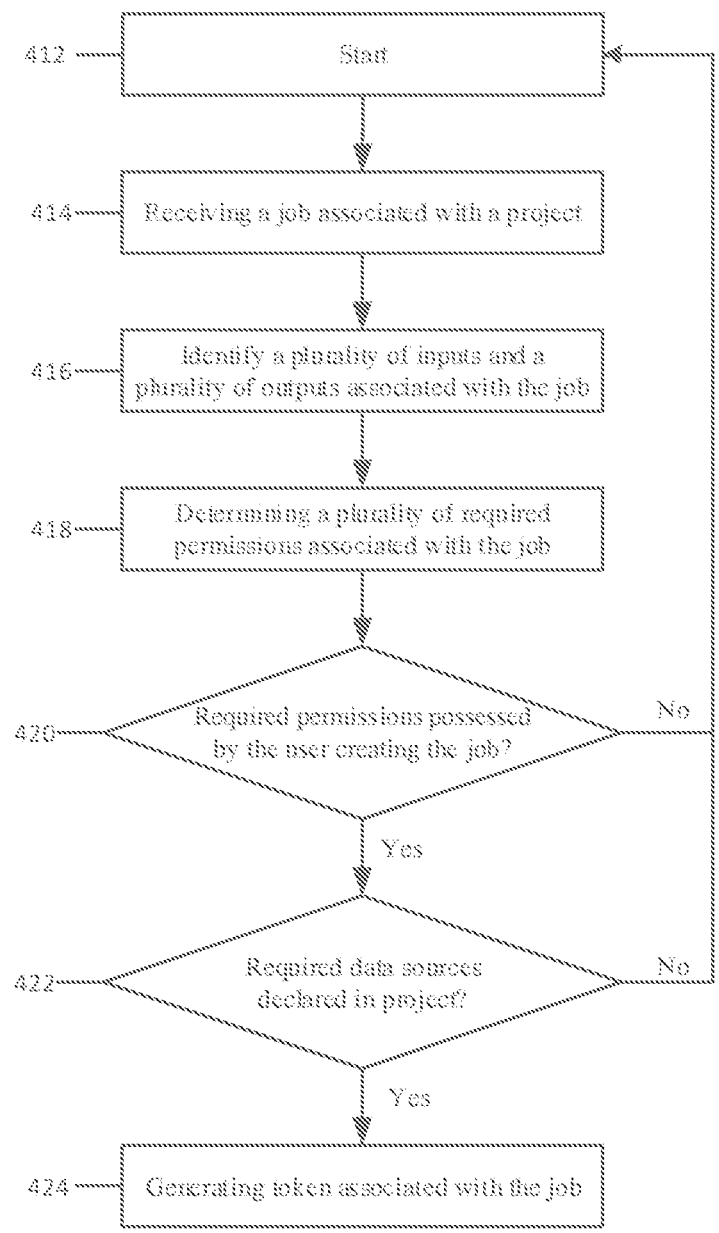
FIG. 4A illustrates an example method for creating a new job and a permission token associated with the job in accordance with some embodiments.

In some embodiments, a screening process may be applied to a newly created job 320 in order to ensure that the creation of the job 320 is compliant with existing permission policies and that appropriate permissions is available for the job 320 to be executed. FIG. 4A illustrates an example method 400*a* for creating a new job and a permission token associated with the job in accordance with some embodiments. The method 400*a* may be performed by one or more of the servers 106-108 associated with the data processing platform 102, the database server 114, the permission system 104, or a combination of one or more aforementioned components of the network system 100 in coordination with each other. The computer system used to perform the method 400*a*, as well as the methods 400*b* and 400*c* discussed below, may include one or more of the aforementioned components. This computer system is referred to herein as a data processing system. It should be appreciated that, unless otherwise stated, the method can include additional, fewer, or alternative steps performed in similar, parallel, or alternative orders. In some embodiments, the method 400*a* may start at step 412. At step 414, the data processing system may receive, from a client device 118 associated with a user, a job 320 associated with a project 310. The job 320 may have been created by the user using one or more of the network applications 109-111. The job 320 may comprise one or more transformations 325 corresponding to operations on data from one or more data sources 330. The project 310 may be associated with one or more data sources 330. The one or more data sources 330 may be accessible to the project 310. The project 310 may directly comprise one or more of the data sources 330 and may comprise one or more declarations 340 referring to one or more of the data sources 330 that are external to the project 310.

At step 416, the data processing system may identify a plurality of inputs and a plurality of outputs associated with the job 320. The inputs and outputs may be determined based on specifications or content of the job 320. One or more of the inputs may comprise one or more data sources 330 required by one or more transformations 325 associated with the job 320, information associated with data from the data sources 330 that is needed by the one or more transformations 325, other suitable information, or any combination thereof. One or more of the outputs may comprise one or more data sources 330 to which the results of the one or more transformations 325 are to be written to, data in the one or more data sources 330 that the one or more transformations 325 are configured to modify, other suitable information, or any combination thereof. In some embodiments, the data processing system may identify one or more operations to be performed when the one or more transformations are executed in addition to the inputs and outputs.

At step 418, the data processing system may determine a plurality of required permissions associated with the job 320. Each of the required permissions may comprise a permission to perform an operation on a required data source. The operation may correspond to at least one of the inputs and the outputs. The required permissions may comprise reading data from a data source 330 external to the project 310 or writing to a data source 330 external to the project 310. In some embodiments, reading data from and writing data to a data source 330 internal to the project 310 may be authorized by default and without requiring any permissions. As an example, an identified permission associated with the job 320 may comprise reading data from a data source 330 external to the project 310. As another example, an identified permission associated with the job 320 may comprise performing a filtering operation to data obtained from the data source 330 external to the project 310. As yet another example, an identified permission associated with the job 320 may comprise writing a result of the filtering operation to one or more fields of the data source 330 and modify data stored therein.

In some embodiments, the data processing system may verify that the user is authorized to create the job 320. At step 420, the data processing system may identify a plurality of permissions possessed by the user and verify that the permissions possessed by the user comprise the one or more required permissions associated with the job 320. In some embodiments, the data processing system may query the policy database 206 to identify the permissions possessed by the user and determine if the user has necessary permissions to execute the transformations 325 in the job 320. In other embodiments, the data processing system may query the policy database 206 to identify policy objects related to the data sources 330 accessed by the job 320. The data processing system may determine whether the user has necessary permissions to execute the job based on the identified policy objects. If it is verified that the user possesses the required permissions, the method may proceed to step 422. Otherwise, the data processing system may reject the user's request to create or add the new job 320 and return to the beginning step 412. This step ensures that that the creator of the job 320 is authorized to execute the transformations 325 in the job 320. This prevents situations in which a user illegitimately elevates his own permissions by creating jobs exceeding the user's permissions.

In some embodiments, the data processing system may verify that the newly created job 320 stays within the scope of permissions associated with the project 310 that contains the job 320. At step 422, the data processing system may verify that the data sources required by the job 320 are declared in the project 310 (i.e., the data sources are either in the project 310 or referenced in the project 310). In some embodiments, the data processing system may determine a list of data sources 330 accessible to the project 310 based on the declarations 340 associated with the project 310. The data sources 330 accessible to the project 310 may comprise one or more data sources 330 that are internal to the project 310 and one or more data sources 330 that are external to the project 310 but are referenced by the declarations 340 associated with the project 310. The data processing system may then determine whether each of the required data sources to be accessed by the job 320 falls within the data sources accessible to the job's token that is scoped to the project 310. If it is verified that the required data sources for the job 320 are accessible to the project 310, the method may proceed to step 424. Otherwise, the data processing system may reject the user's request to create or add the new job 320 and return to the beginning step 412. If the user has authorization to make modifications to the project 310, the user may be prompted to edit one or more declarations 340 of the project to add references to the required data sources.

In some embodiments, the data processing system may control execution of the newly created job using a permission token. At step 424, the data processing system may generate a token associated with the job 320, where the token is required for execution of the job 320. The token may encode the required permissions associated with the job. In some embodiments, the data processing system may store the token in association with one or more criteria for a user to execute one or more transformations 325 associated with the job 320. The one or more criteria may specify, for example, identities of users who can execute the job 320, types of users who can execute the job 320, permissions required for executing the job 320, other suitable criteria, or any combination thereof. Here, the permissions required for executing the job 320 may or may not be less than the permissions required for creating the job 320. In some embodiments, the data processing system may store the token also in association with one or more criteria for a user to access the results of executing one or more transformations 325 associated with the job 320. The results may or may not require stricter permissions than the execution of the job 320 or the creation of the job 320. The criteria for creating the job 320, executing the job 320, and accessing the results of the execution may be flexibly defined based on inputs of the creator of the job 320 and existing security rules maintained by the data processing system. When the token is created, one or more policies may be registered with the permission system 104. As an example, such a policy may specify that access requests associated with transformations 325 in the job 320 must be accompanied by the token. The permission system 104 may reject all access requests associated with the job 320 that does not carry the token. In this manner, authority to execute the job 320 or view the results thereof may be limited by ownership of the token.

Figure 4B:
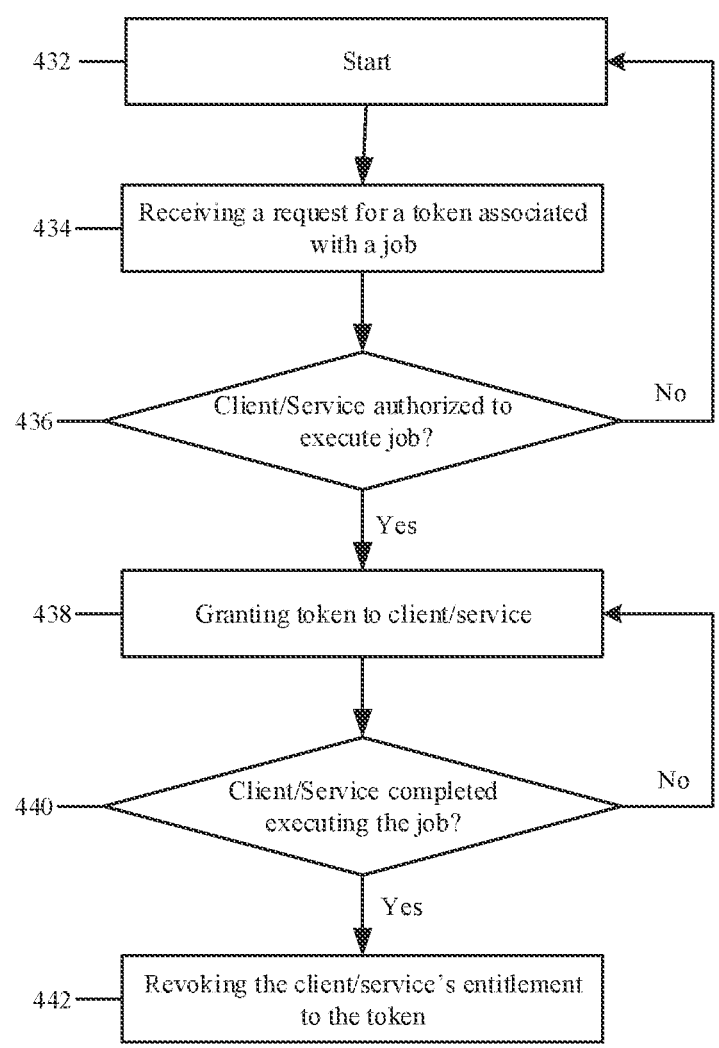
FIG. 4B illustrates an example method for granting a permission token to a service in accordance with some embodiments.

In some embodiments, the data processing system may control execution of a job 320 using a permission token associated with the job. FIG. 4B illustrates an example method 400b for granting a permission token to a client or service in accordance with some embodiments. It should be appreciated that, unless otherwise stated, the method can include additional, fewer, or alternative steps performed in similar, parallel, or alternative orders. The method 400b may start at step 432. At step 434, the data processing system may receive, from a client device 118 or service, a request for a token associated with a job 320. Here, the client device 118 or service may or may not be associated with the creator of the job 320. The client device 118 or service may request the token associated with the job 320 in order to satisfy one or more permission requirements for executing the job 320.

At step 436, the data processing system may determine whether the client device 118 or service is authorized to execute the job 320. In some embodiments, the data processing system may make the determination based on one or more criteria for executing the job that are stored in association with the job 320. In other embodiments, the data processing system may verify whether the client device 118 or service possesses one or more permissions required by one or more transformations 325 in the job 320. If it is verified that the client device 118 or service is authorized to execute the job 320, the method 400b may proceed to step 438. Otherwise, the data processing system may reject the request for the token and return to the beginning step 432.

At step 438, the data processing system may grant the token to the client device 118 or service. Granting the token may comprise sending the token to the client device 118 or one or more computing devices associated with the service. With the token, the client device 118 or service may proceed to execute one or more transformations 325 associated with the job 320. Further details about the execution of the transformations 325 is described with reference to FIG. 4C.

At step 440, the data processing system may determine whether the client device 118 or service has completed executing the job 320. If so, the method 400b may proceed to step 442, in which the data processing system may revoke the client device 118 or service's entitlement to the token. As an example, the data processing system may remove a stored connection between the client device 118 or service and the token. As another example, the data processing system may modify one or more policy objects in the policy database 206 such that the client device 118 or service cannot access the relevant data sources 330 even with the token. In this manner, a client device 118 or service's access to data sources 330 related to a job 320 may be controlled by granting or revoking the token. This may prevent security risks associated with a user's arbitrary execution of the job 320 and improves the flexibility of permission management.

Figure 4C:
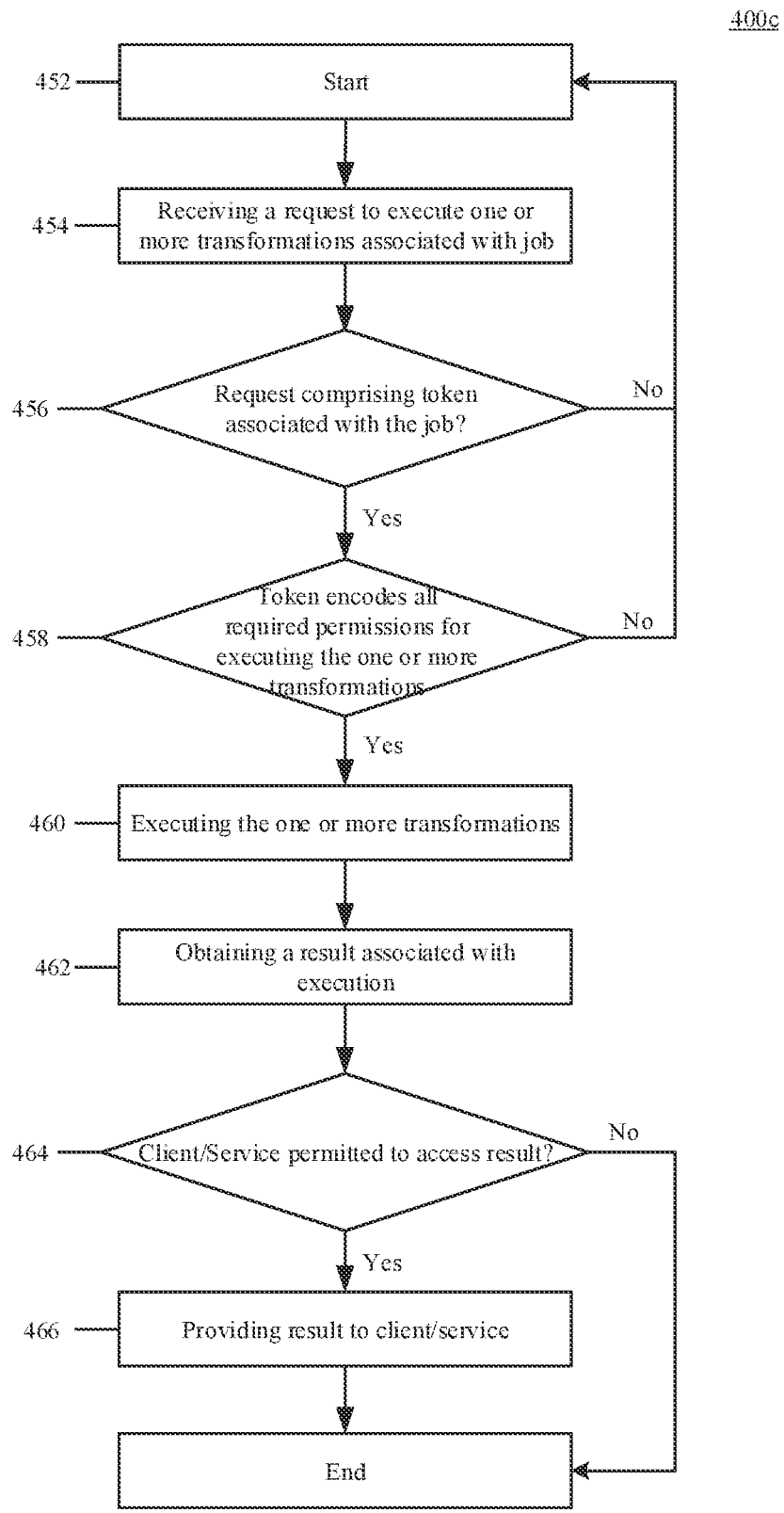
FIG. 4C illustrates an example method for executing one or more transformations associated with a job based on a permission token in accordance with some embodiments.

In some embodiments, a client device 118 or service may present a token associated with a job 320 as credentials for obtaining permissions to execute transformations 325 in the job 320. FIG. 4C illustrates an example method 400c for executing one or more transformations associated with a job based on a permission token in accordance with some embodiments. It should be appreciated that, unless otherwise stated, the method can include additional, fewer, or alternative steps performed in similar, parallel, or alternative orders. The method 400c may start at step 452. At step 454, the data processing system may receive, from a client device 118 or service, a request to execute one or more data transformations 325. The one or more data transformations 325 may be associated with a job 320 that is included in a project 310. The client device 118 or service may or may not be associated with a creator of the job 320.

At step 456, data processing system may determine whether the request comprises the token associated with the job 320. If so, the method 400c may proceed to step 458. Otherwise, the data processing system may reject the request and return to the beginning step 452.

In some scenarios, a client device 118 or service may claim that the one or more data transformations 325 are associated with the job 320, while one or more of the data transformations 325 may have been modified. To prevent security risks associated with such scenarios, the data processing system may check whether the permissions required by the data transformations 325 are consistent with those associated with the job. At step 458, the data processing system may verify that the required permissions encoded in the token comprise each of one or more permissions required for executing the one or more data transformations 325. If the verification is successful, the method 400c may proceed to step 460. The data processing system may communicate to the client device 118 or service, a response approving the request. If it is determined that at least one of the one or more data transformations 325 require a permission exceeding the required permissions encoded in the token, the data processing system may reject the request and return to the beginning step 452. The data processing system may communicate, to the client device 118 or service, a response denying the request.

The data processing system may execute the one or more transformations that the client device 118 or service requests at step 460 and obtain a result associated with the execution of the one or more transformations at step 462. The result may comprise, for example, one or more data sets, one or more calculation results, one or more visual illustrations, other suitable information, or any combination thereof. As explained above, the permissions required for executing the transformations and the permissions required to access the result of the execution may be different. A client device 118 or service authorized to execute the transformations may or may not be authorized to view the results. At step 464, the data processing system may determine whether the client device 118 or service is permitted to access the result. If it is verified that the client device 118 or service possesses one or more permissions required for accessing the result, the method may proceed to step 466, where the data processing system may provide the result to the client device 118 or service. Otherwise, the data processing system may terminate the process without providing the client device 118 or service the result. The data processing system may provide the result to one or more other client devices 118 or services that possess necessary permissions for accessing the result.

Figure 5:
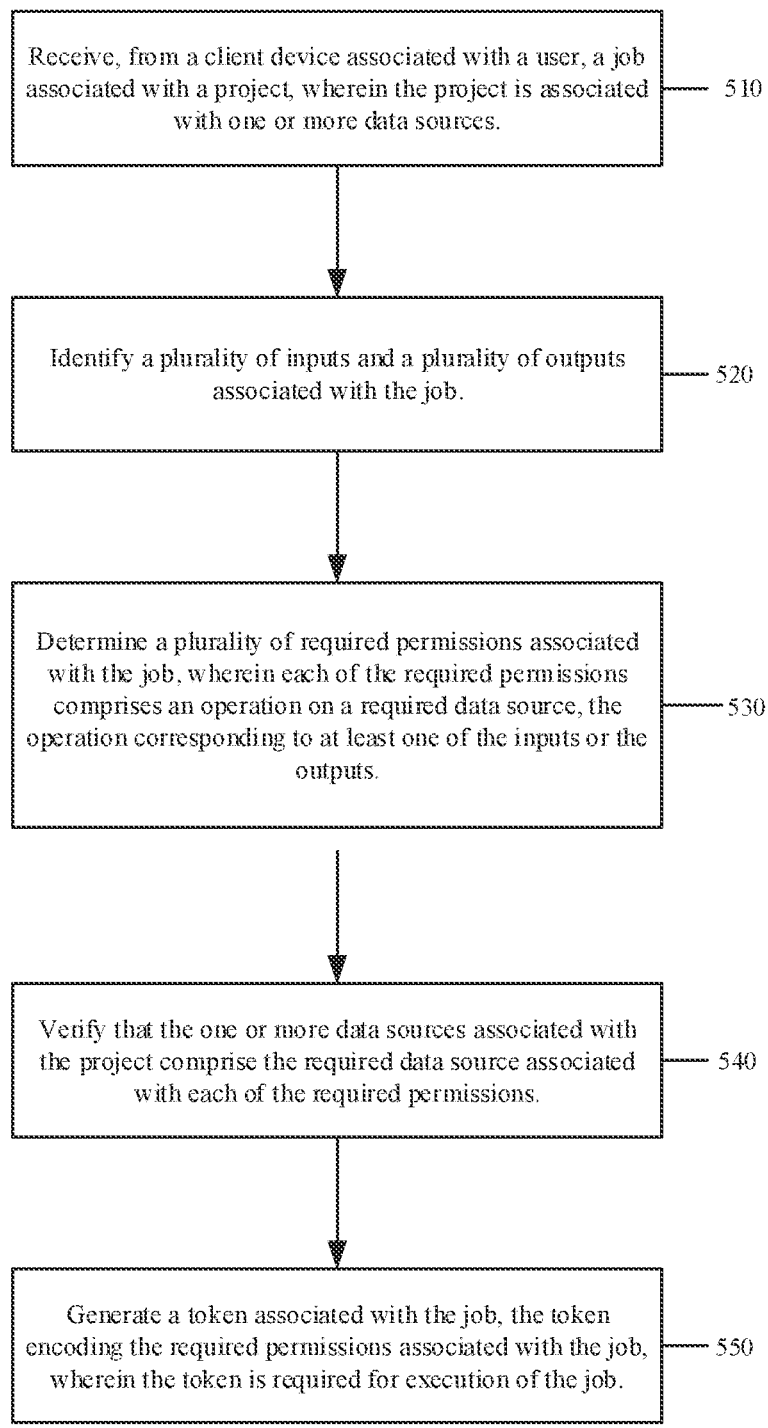
FIG. 5 illustrates an example method for generating a permission token corresponding to a job in accordance with some embodiments.

FIG. 5 illustrates an example method 500 for generating a permission token corresponding to a job in accordance with some embodiments. It should be appreciated that, unless otherwise stated, the method can include additional, fewer, or alternative steps performed in similar, parallel, or alternative orders.

At block 510, the example method 500 may receive, from a client device associated with a user, a job associated with a project, wherein the project is associated with one or more data sources. At block 520, the example method 500 may identify a plurality of inputs and a plurality of outputs associated with the job. At block 530, the example method 500 may determine a plurality of required permissions associated with the job, wherein each of the required permissions comprises an operation on a required data source, the operation corresponding to at least one of the inputs or the outputs. At block 540, the example method 500 may verify that the one or more data sources associated with the project comprise the required data source associated with each of the required permissions. At block 550, the example method 500 may generate a token associated with the job, the token encoding the required permissions associated with the job, wherein the token is required for execution of the job.

Hardware Implementation

Figure 6:
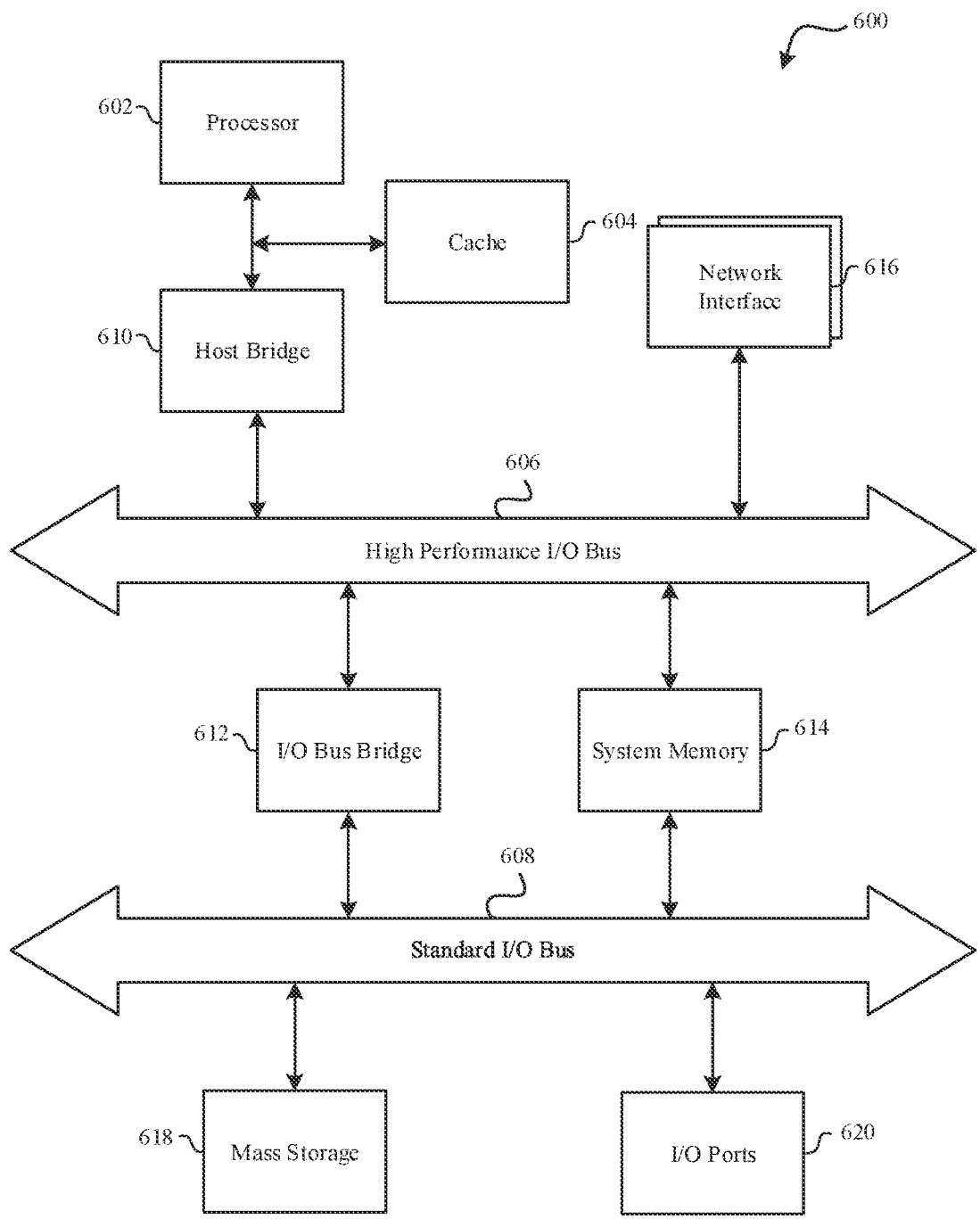
FIG. 6 illustrates an example computer system or computing device that can be used to implemented any of the embodiments disclosed herein.

The described methods can be implemented by a wide variety of machine and computer system architectures and in a wide variety of network and computing environments. FIG. 6 illustrates an example of a computer system 600 that can be used to implement one or more of the described embodiments. The computer system 600 includes sets of instructions for causing the computer system 600 to perform the described processes. The computer system 600 can be connected (e.g., networked) to other machines. In a networked deployment, the computer system 600 can operate in the capacity of a server machine or a client machine in a client-server network environment, or as a peer machine in a peer-to-peer (or distributed) network environment. In some embodiments, the computer system 600 may be used to implement one or more components of the network system 100 illustrated in FIG. 1. For example, the computer system 600 may be used to implement the entirety or part of the data processing platform 102, one or more of the servers 106-108, the client device 118, the database server 114, or the permission system 104.

The computer system 600 includes a processor 602, a cache 604, and one or more executable modules and drivers, stored on a computer-readable medium, directed to the described processes. Additionally, the computer system 600 includes a high performance input/output (I/O) bus 606 and a standard I/O bus 608. A host bridge 610 couples processor 602 to high performance I/O bus 606, whereas I/O bus bridge 612 couples the two buses 606 and 608 to each other. A system memory 614 and one or more network interfaces 616 couple to high performance I/O bus 606. The computer system 600 can further include video memory and a display device coupled to the video memory (not shown). Mass storage 618 and I/O ports 620 couple to the standard I/O bus

608. The computer system 600 can optionally include a keyboard and pointing device, a display device, or other input/output devices (not shown) coupled to the standard I/O bus 608. Collectively, these elements are intended to represent a broad category of computer hardware systems, including but not limited to computer systems based on the x86-compatible processors manufactured by Intel Corporation of Santa Clara, California, and the x86-compatible processors manufactured by Advanced Micro Devices (AMD), Inc., of Sunnyvale, California, as well as any other suitable processor.

An operating system manages and controls the operation of the computer system 600, including the input and output of data to and from software applications (not shown). The operating system provides an interface between the software applications being executed on the system and the hardware components of the system. Any suitable operating system can be used, such as the LINUX Operating System, the Apple Macintosh Operating System, available from Apple Computer Inc. of Cupertino, California, UNIX operating systems, Microsoft® Windows® operating systems, BSD operating systems, and the like. Other implementations are possible.

The elements of the computer system 600 are described in greater detail below. In particular, the network interface 616 provides communication between the computer system 600 and any of a wide range of networks, such as an Ethernet (e.g., IEEE 802.3) network, a backplane, etc. The mass storage 618 provides permanent storage for the data and programming instructions to perform the above-described processes and features implemented by the respective computing systems identified above, whereas the system memory 614 (e.g., DRAM) provides temporary storage for the data and programming instructions when executed by the processor 602. The I/O ports 620 can be one or more serial or parallel communication ports, which provide communication between additional peripheral devices that can be coupled to the computer system 600.

The computer system 600 can include a variety of system architectures, and various components of the computer system 600 can be rearranged. For example, the cache 604 can be on-chip with processor 602. Alternatively, the cache 604 and the processor 602 can be packed together as a "processor module," with processor 602 being referred to as the "processor core." Furthermore, certain embodiments of the disclosure can neither require nor include all of the above components. For example, peripheral devices coupled to the standard I/O bus 608 can couple to the high performance I/O bus 606. In addition, in some embodiments, only a single bus can exist, with the components of the computer system 600 being coupled to the single bus. Moreover, the computer system 600 can include additional components, such as additional processors, storage devices, or memories.

In general, the described processes can be implemented as part of an operating system or a specific application, component, program, object, module, or series of instructions referred to as "programs." For example, one or more programs can be used to execute specific processes. The programs typically comprise one or more instructions in various memory and storage devices in the computer system 600 that, when read and executed by one or more processors, cause the computer system 600 to perform operations to execute the described processes. The described processes can be implemented in software, firmware, hardware (e.g., an application specific integrated circuit), or any combination of these.

In one implementation, the described processes are implemented as a series of executable modules run by the computer system 600, individually or collectively in a distributed computing environment. The foregoing modules can be realized by hardware, executable modules stored on a computer-readable medium (or machine-readable medium), or a combination of both. For example, the modules can comprise a plurality or series of instructions to be executed by a processor in a hardware system, such as the processor 602. Initially, the series of instructions can be stored on a storage device, such as the mass storage 618. However, the series of instructions can be stored on any suitable computer readable storage medium. Furthermore, the series of instructions need not be stored locally, and could be received from a remote storage device, such as a server on a network, via the network interface 616. The instructions are copied from the storage device, such as the mass storage 618, into the system memory 614 and then accessed and executed by the processor 602. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 600 to perform any one or more of the described processes.

Engines, Components, and Logic

Certain embodiments are described in this application as including logic or a number of components, engines, or mechanisms. Engines can constitute either software engines (e.g., code embodied on a machine-readable medium) or hardware engines. A "hardware engine" is a tangible unit capable of performing certain operations and can be configured or arranged in a certain physical manner. In various example embodiments, one or more computer systems (e.g., a standalone computer system, a client computer system, or a server computer system) or one or more hardware engines of a computer system (e.g., a processor or a group of processors) can be configured by software (e.g., an application or application portion) as a hardware engine that operates to perform certain operations as described in this application.

In some embodiments, a hardware engine can be implemented mechanically, electronically, or any suitable combination thereof. For example, a hardware engine can include dedicated circuitry or logic that is permanently configured to perform certain operations. For example, a hardware engine can be a special-purpose processor, such as a Field-Programmable Gate Array (FPGA) or an Application Specific Integrated Circuit (ASIC). A hardware engine can also include programmable logic or circuitry that is temporarily configured by software to perform certain operations. For example, a hardware engine can include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) can be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described in this application. As used in this disclosure, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor can be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines can be regarded as being communicatively coupled. Where multiple hardware engines exist contemporaneously, communications can be achieved through signal transmission (e.g., over appropriate circuits and buses) between or among two or more of the hardware engines. In embodiments in which multiple hardware engines are configured or instantiated at different times, communications between such hardware engines can be achieved, for example, through the storage and retrieval of information in memory structures to which the multiple hardware engines have access. For example, one hardware engine can perform an operation and store the output of that operation in a memory device to which it is communicatively coupled. A further hardware engine can then, at a later time, access the memory device to retrieve and process the stored output. Hardware engines can also initiate communications with input or output devices, and can operate on a resource (e.g., a collection of information).

The various operations of example methods described in this application can be performed, at least partially, by one or more processors that are temporarily configured (e.g., by software) or permanently configured to perform the relevant operations. Whether temporarily or permanently configured, such processors can constitute processor-implemented engines that operate to perform one or more operations or functions described in this application. As used in this disclosure, "processor-implemented engine" refers to a hardware engine implemented using one or more processors.

Similarly, the methods described in this application can be at least partially processor-implemented, with a particular processor or processors being an example of hardware. For example, at least some of the operations of a method can be performed by one or more processors or processor-implemented engines. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an Application Program Interface (API)).

The performance of certain of the operations can be distributed among the processors, not only residing within a single machine, but deployed across a number of machines. In some example embodiments, the processors or processor-implemented engines can be located in a single geographic location (e.g., within a home environment, an office environment, or a server farm). In other example embodiments, the processors or processor-implemented engines can be distributed across a number of geographic locations.

It should be appreciated from the foregoing description that the present disclosure provides methods, systems, and non-transitory computer readable media configured display a geographical map overlaid with a marker layer, and provide an improved method of visualizing geospatial data, allowing trends and patterns to be revealed at smaller map scales while maintaining the ability to identify individual markers at small and large scales.

Language

Although the disclosure has been described in detail for the purpose of illustration based on what is currently considered to be the most practical and preferred implementations, it is to be understood that such detail is solely for that purpose and that the disclosure is not limited to the disclosed implementations. On the contrary, the disclosure is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

For purposes of explanation, numerous specific details are outlined to provide a thorough understanding of the description. It will be apparent, however, to one skilled in the art that embodiments of the disclosure can be practiced without these specific details. In some instances, modules, structures, processes, features, and devices are shown in block diagram form to avoid obscuring the description. In other instances, functional block diagrams and flow diagrams are shown to represent data and logic flows. The components of block diagrams and flow diagrams (e.g., modules, blocks, structures, devices, features, etc.) can be variously combined, separated, removed, reordered, and replaced in a manner other than as expressly described and depicted.

Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter of this application.

Additionally, boundaries between various resources, operations, engines, engines, and data stores are somewhat arbitrary, and particular operations are illustrated in a context of specific illustrative configurations. Other allocations of functionality are envisioned and can fall within a scope of various embodiments of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Specific methods, devices, and materials are described, although any methods and materials similar or equivalent to those described can be used in the practice or testing of the present embodiment. Unless defined otherwise, all technical and scientific terms used in this description have the same meanings as commonly understood by one of ordinary skill in the art to which this embodiment belongs.

The terms "a," "an," and "at least one" encompass one or more of the specified element. Thus, plural instances can be provided for resources, operations, or structures described in this application as a single instance. That is, if two of a particular element are present, one of these elements is also present and thus "an" element is present. The terms "a plurality of" and "plural" mean two or more of the specified element. The term "or" used between the last two of a list of elements means any one or more of the listed elements. For example, the phrase "A, B, or C" means "A, B, and/or C," which means "A," "B," "C," "A and B," "A and C," "B and C," or "A, B, and C."

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether there is express reference to an "embodiment" or the like, various features are described, which can be variously combined and included in some embodiments, but also variously omitted in other embodiments. Similarly, various features are described that can be preferences or requirements for some embodiments, but not other embodiments.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements or steps are included or are to be performed in any particular embodiment.

It will be appreciated that an "engine," "system," "data store," or "database" can comprise software, hardware, firmware, or circuitry. In one example, one or more software programs comprising instructions capable of being executable by a processor can perform one or more of the functions of the engines, data stores, databases, or systems described in this application. In another example, circuitry can perform the same or similar functions. Alternative embodiments can comprise more, less, or functionally equivalent engines, systems, data stores, or databases, and still be within the scope of present embodiments. For example, the functionality of the various systems, engines, data stores, or databases can be combined or divided differently.

The data stores described in this application can be any suitable structure (e.g., an active database, a high-scale time series database, relational database, a self-referential database, a table, a matrix, an array, a flat file, a documented-oriented storage system, a non-relational No-SQL system, and the like), and can be cloud-based or otherwise.

Without further elaboration, it is believed that one skilled in the art, using the proceeding description, can make and use the present disclosure to the fullest extent. The disclosure has been described in detail with reference only to the presently preferred embodiments. Persons skilled in the art will appreciate that various modifications can be made without departing from the disclosure. Accordingly, the disclosure is defined only by the following claims, along with the full range of equivalents to which the claims are entitled.

The invention claimed is:

1. A computer-implemented method, implemented by a computing system, the method comprising:
   receiving, from a client device associated with a user or from a service, a job associated with a project, wherein the project is associated with one or more data sources;
   determining first permissions corresponding to the client device or the service and second permissions corresponding to a second client device or a second service, wherein:
      each of the first permissions comprises an operation on a data source;
   generating a token associated with the job, the token encoding the first permissions or the second permissions;
   receiving a request from the client device or the service for the token;
   determining whether the client device or the service is authorized to execute the job based on the first permissions;
   in response to determining that the client device or the service is authorized to execute the job, granting the token to the client device or the service to enable the client device or the service to execute the job; and
   in response to executing the job, selectively transmitting a result of the execution of the job to a different client device or a different service based on whether the different client device or the different service is authorized to access the result, based on the second permissions.

2. The computer-implemented method of claim 1, wherein the job comprises one or more data transformations.

3. The computer-implemented method of claim 1, wherein the one or more data sources associated with the project comprise:
   one or more data sources internal to the project; or
   one or more data sources external to the project, wherein the project comprises a reference to each of the one or more data sources external to the project.

4. The computer-implemented method of claim 1, wherein the one or more required permissions comprise:
   reading data from a data source external to the project; or
   writing to a data source external to the project.

5. The computer-implemented method of claim 1, further comprising:
   communicating, to the client device or the service, a response approving the request.

6. The computer-implemented method of claim 1, further comprising:
   obtaining a result associated with execution of the one or more data transformations;

verifying that the service possesses one or more access permissions associated with accessing the result; and providing the result to the service.

7. The computer-implemented method of claim 1, wherein the service comprises a first service, the request comprises a first request, and the computer-implemented method further comprising:

receiving, from a second service, a second request to execute one or more data transformations, wherein the second request comprises the token associated with the job;

determining that at least one of the one or more data transformations require a permission exceeding the permissions encoded in the token; and communicating, to the second service, a response denying the request.

8. A system comprising:

at least one processor; and a memory storing instructions that, when executed by the at least one processor, cause the system to perform operations comprising:

receiving, from a client device associated with a user or from a service, a job associated with a project, wherein the project is associated with one or more data sources;

determining first permissions corresponding to the client device or the service and second permissions corresponding to a second client device or a second service, wherein:

each of the first permissions comprises an operation on a data source;

generating a token associated with the job, the token encoding the first permissions or the second permissions;

receiving a request from the client device or the service for the token;

determining whether the client device or the service is authorized to execute the job based on the first permissions;

in response to determining that the client device or the service is authorized to execute the job, granting the token to the client device or the service to enable the client device or the service to execute the job; and in response to executing the job, selectively transmitting a result of the execution of the job to a different client device or a different service based on whether the different client device or the different service is authorized to access the result, based on the second permissions.

9. The system of claim 8, wherein the job comprises one or more data transformations.

10. The system of claim 8, wherein the one or more data sources associated with the project comprise:

one or more data sources internal to the project; or one or more data sources external to the project, wherein the project comprises a reference to each of the one or more data sources external to the project.

11. The system of claim 8, wherein the one or more required permissions comprise:

reading data from a data source external to the project; or writing to a data source external to the project.

12. The system of claim 8, wherein the instructions that, when executed by the at least one processor, cause the system to perform operations comprising:

communicating, to the client device or the service, a response approving the request.

13. The system of claim 8, wherein the instructions that, when executed by the at least one processor, cause the system to perform operations comprising:

obtaining a result associated with execution of the one or more data transformations;

verifying that the service possesses one or more access permissions associated with accessing the result; and providing the result to the service.

14. The system of claim 8, wherein the service comprises a first service, the request comprises a first request, and the instructions that, when executed by the at least one processor, cause the system to perform operations comprising:

receiving, from a second service, a second request to execute one or more data transformations, wherein the second request comprises the token associated with the job;

determining that at least one of the one or more data transformations require a permission exceeding the permissions encoded in the token; and communicating, to the second service, a response denying the request.

15. A non-transitory computer readable medium comprising instructions that, when executed, cause one or more processors to perform:

receiving, from a client device associated with a user or from a service, a job associated with a project, wherein the project is associated with one or more data sources;

determining first permissions corresponding to the client device or the service and second permissions corresponding to a second client device or a second service, wherein:

each of the first permissions comprises an operation on a data source;

generating a token associated with the job, the token encoding the first permissions or the second permissions;

receiving a request from the client device or the service for the token;

determining whether the client device or the service is authorized to execute the job based on the first permissions;

in response to determining that the client device or the service is authorized to execute the job, granting the token to the client device or the service to enable the client device or the service to execute the job; and in response to executing the job, selectively transmitting a result of the execution of the job to a different client device or a different service based on whether the different client device or the different service is authorized to access the result, based on the second permissions.

16. The non-transitory computer readable medium of claim 15, wherein the job comprises one or more data transformations.

17. The non-transitory computer readable medium of claim 15, wherein the one or more data sources associated with the project comprise:

one or more data sources internal to the project; or one or more data sources external to the project, wherein the project comprises a reference to each of the one or more data sources external to the project.

18. The non-transitory computer readable medium of claim 15, wherein the one or more required permissions comprise:

reading data from a data source external to the project; or writing to a data source external to the project.

19. The non-transitory computer readable medium of claim 15, wherein the instructions that, when executed, cause one or more processors to perform:
- obtaining a result associated with execution of the one or more data transformations;
- verifying that the service possesses one or more access permissions associated with accessing the result; and
- providing the result to the service.

20. The non-transitory computer readable medium of claim 15, wherein the service comprises a first service, the request comprises a first request, and the instructions that, when executed, cause one or more processors to perform:
- receiving, from a second service, a second request to execute one or more data transformations, wherein the second request comprises the token associated with the job;
- determining that at least one of the one or more data transformations require a permission exceeding the permissions encoded in the token; and
- communicating, to the second service, a response denying the request.

\* \* \* \* \*